United States Patent
Sperandei et al.

(10) Patent No.: US 12,195,160 B2
(45) Date of Patent: Jan. 14, 2025

(54) DEVICE FOR GENERATING POWER, COMPRISING AN AIR-TOWED VESSEL TOWING AT LEAST ONE WATER CURRENT TURBINE

(71) Applicant: Airbus SAS, Blagnac (FR)

(72) Inventors: Jean Sperandei, Blagnac (FR); Clément Bourrat, Blagnac (FR)

(73) Assignee: Airbus SAS, Blagnac (FR)

( * ) Notice: Subject to any disclaimer, the term of this patent is extended or adjusted under 35 U.S.C. 154(b) by 78 days.

(21) Appl. No.: 17/923,480

(22) PCT Filed: May 17, 2021

(86) PCT No.: PCT/EP2021/062948
§ 371 (c)(1),
(2) Date: Nov. 4, 2022

(87) PCT Pub. No.: WO2021/239485
PCT Pub. Date: Dec. 2, 2021

(65) Prior Publication Data
US 2023/0192265 A1    Jun. 22, 2023

(30) Foreign Application Priority Data
May 28, 2020   (FR) ........................... 2005655

(51) Int. Cl.
*B63J 3/04*         (2006.01)
*B63B 21/66*        (2006.01)
(Continued)

(52) U.S. Cl.
CPC .................. *B63J 3/04* (2013.01); *B63B 21/66* (2013.01); *B63B 35/44* (2013.01); *B63H 9/069* (2020.02); *B63B 2035/4466* (2013.01)

(58) Field of Classification Search
CPC ....... B63J 3/04; B63J 2003/046; B63B 21/66; B63B 35/44; B63B 2035/4466; B63H 9/069; Y02E 10/30
See application file for complete search history.

(56) References Cited

U.S. PATENT DOCUMENTS

| 868,798 A | 10/1907 | McLaughlin |
| 2,501,696 A * | 3/1950 | Souczek ............... F03B 17/061 |
| | | 416/85 |

(Continued)

FOREIGN PATENT DOCUMENTS

| DE | 2544939 A1 | 4/1977 |
| EP | 1199098 A1 | 4/2002 |

(Continued)

OTHER PUBLICATIONS

International Search Report dated Aug. 4, 2021; priority document.

*Primary Examiner* — Pedro J Cuevas
(74) *Attorney, Agent, or Firm* — Greer, Burns & Crain, Ltd.

(57) ABSTRACT

A device for producing energy includes an air-towed vessel, and at least one water current turbine linked to the vessel by at least one electric cable. The water current turbine is linked to the vessel by at least one mechanical linking cable to be towed by the vessel. The water current turbine is spaced apart from the vessel, which makes it possible to increase the diameter of the turbine and to reduce the interactions between the turbine and the vessel. Moreover, it is then possible to provide a plurality of water current turbines towed by the same vessel.

17 Claims, 6 Drawing Sheets

(51) Int. Cl.
  *B63B 35/44* (2006.01)
  *B63H 9/069* (2020.01)

(56) References Cited

U.S. PATENT DOCUMENTS

| | | | | |
|---|---|---|---|---|
| 3,619,632 A * | 11/1971 | Labombarde | ............... | B63J 3/04 |
| | | | | 114/39.21 |
| 3,986,787 A * | 10/1976 | Mouton, Jr. | ......... | F03B 17/061 |
| | | | | 415/121.2 |
| 3,999,499 A * | 12/1976 | Kitabayashi | .............. | B63G 8/42 |
| | | | | 114/244 |
| 4,025,220 A * | 5/1977 | Thompson | ............ | F03B 17/061 |
| | | | | 415/908 |
| 4,102,291 A * | 7/1978 | Sebald | ........................ | B63J 3/00 |
| | | | | 114/244 |
| 4,159,427 A * | 6/1979 | Wiedemann | ............... | F03G 7/00 |
| | | | | 416/85 |
| 4,219,303 A * | 8/1980 | Mouton, Jr. | ......... | F03B 17/061 |
| | | | | 416/85 |
| 4,335,093 A * | 6/1982 | Salomon | ................... | F03D 9/25 |
| | | | | 244/33 |
| 4,383,182 A * | 5/1983 | Bowley | ................. | F03B 17/061 |
| | | | | 416/85 |
| 4,850,190 A * | 7/1989 | Pitts | ......................... | F03B 13/10 |
| | | | | 60/495 |
| 4,864,152 A * | 9/1989 | Pedersen | ............... | F03B 17/061 |
| | | | | 290/53 |
| 4,868,408 A * | 9/1989 | Hesh | ..................... | F03B 17/061 |
| | | | | 415/908 |
| 6,091,161 A * | 7/2000 | Dehlsen | ................. | F03B 13/10 |
| | | | | 290/43 |
| 6,139,255 A * | 10/2000 | Vauthier | ............... | F03B 13/264 |
| | | | | 416/85 |
| 6,168,373 B1 * | 1/2001 | Vauthier | ................. | F03B 13/10 |
| | | | | 415/908 |
| 6,327,994 B1 * | 12/2001 | Labrador | ............... | B63B 39/06 |
| | | | | 114/382 |
| 6,531,788 B2 * | 3/2003 | Robson | ................. | F03B 17/061 |
| | | | | 290/43 |
| 6,626,638 B2 * | 9/2003 | Rosefsky | ................. | B63H 1/12 |
| | | | | 415/908 |
| 7,146,918 B2 * | 12/2006 | Meller | .................... | B63B 35/44 |
| | | | | 114/39.26 |
| 7,228,812 B2 * | 6/2007 | Morse | ..................... | B63J 3/04 |
| | | | | 114/382 |
| 7,298,056 B2 * | 11/2007 | Gizara | .................... | F01D 25/24 |
| | | | | 114/274 |
| 7,441,988 B2 * | 10/2008 | Manchester | .......... | F03B 13/264 |
| | | | | 405/75 |
| 7,955,148 B2 * | 6/2011 | Corradini | .............. | F03B 17/061 |
| | | | | 290/43 |
| 8,197,180 B1 * | 6/2012 | Lamp | ........................ | F03B 7/00 |
| | | | | 415/906 |
| 8,219,257 B2 * | 7/2012 | Hunt | ....................... | B63B 21/50 |
| | | | | 700/288 |
| 8,237,304 B2 * | 8/2012 | Dehlsen | ................. | F03B 17/061 |
| | | | | 290/43 |
| 8,288,882 B2 * | 10/2012 | Bolin | ...................... | F03B 17/061 |
| | | | | 290/43 |
| 8,421,260 B2 * | 4/2013 | Duke | ...................... | F03B 13/264 |
| | | | | 290/54 |
| 8,558,403 B2 * | 10/2013 | Rooney | ................. | F03B 17/061 |
| | | | | 290/43 |
| 8,587,144 B2 * | 11/2013 | Urch | ......................... | F03D 1/04 |
| | | | | 290/55 |
| 8,729,723 B2 * | 5/2014 | Boureau | ................. | F03D 80/85 |
| | | | | 290/55 |
| 8,736,096 B2 * | 5/2014 | Kiyose | .................... | H02K 7/1823 |
| | | | | 290/43 |
| 8,766,466 B2 * | 7/2014 | Dehlsen | ................. | F03B 17/061 |
| | | | | 290/43 |
| 8,884,458 B2 * | 11/2014 | Williams | .................. | F03D 9/28 |
| | | | | 290/55 |
| 9,163,607 B2 * | 10/2015 | Tabe | ........................ | F03D 9/25 |
| 9,353,033 B2 * | 5/2016 | Vander Lind | ......... | C07C 29/151 |
| 9,784,243 B2 * | 10/2017 | Vander Lind | .......... | B63H 9/072 |
| 9,989,038 B2 * | 6/2018 | Barber | ...................... | F03D 9/25 |
| 10,272,979 B2 * | 4/2019 | Duckworth | ................ | B63J 3/04 |
| 11,353,001 B1 * | 6/2022 | McMullan | ............... | F03B 17/061 |
| 2002/0088222 A1 * | 7/2002 | Vauthier | ............... | F03B 17/061 |
| | | | | 60/398 |
| 2002/0158472 A1 * | 10/2002 | Robson | ................. | F03B 17/061 |
| | | | | 290/43 |
| 2003/0080245 A1 * | 5/2003 | Greenberg | ............... | F03D 9/008 |
| | | | | 244/61 |
| 2005/0252764 A1 * | 11/2005 | Meller | .................... | B63B 35/44 |
| | | | | 322/4 |
| 2006/0162642 A1 * | 7/2006 | Morse | ...................... | F03D 9/19 |
| | | | | 114/382 |
| 2007/0046028 A1 * | 3/2007 | Gizara | .................... | B63B 1/24 |
| | | | | 290/54 |
| 2007/0241566 A1 * | 10/2007 | Kuehnle | ............... | F03B 17/061 |
| | | | | 290/53 |
| 2007/0250226 A1 * | 10/2007 | Wrage | .................... | B63H 9/071 |
| | | | | 290/1 R |
| 2007/0284882 A1 * | 12/2007 | Costin | .................... | F03B 17/061 |
| | | | | 290/43 |
| 2008/0012345 A1 * | 1/2008 | Parker | ................... | F03B 17/061 |
| | | | | 290/54 |
| 2008/0078316 A1 * | 4/2008 | Gizara | .................... | H02K 7/1823 |
| | | | | 114/39.24 |
| 2010/0001534 A1 | 1/2010 | Kim | | |
| 2010/0090467 A1 * | 4/2010 | Corradini | .................. | F03G 7/10 |
| | | | | 74/DIG. 9 |
| 2010/0181774 A1 * | 7/2010 | Dehlsen | ................ | B63B 22/18 |
| | | | | 290/54 |
| 2010/0244450 A1 * | 9/2010 | Tabe | ...................... | F03B 13/262 |
| | | | | 290/55 |
| 2011/0095530 A1 * | 4/2011 | Blumer | ................. | F03B 17/061 |
| | | | | 290/43 |
| 2011/0204641 A1 * | 8/2011 | Corradini | .............. | F03B 17/061 |
| | | | | 290/52 |
| 2011/0241347 A1 * | 10/2011 | Boureau | .................... | F03D 9/25 |
| | | | | 405/195.1 |
| 2012/0013128 A1 * | 1/2012 | Duke | ...................... | F03B 13/10 |
| | | | | 290/54 |
| 2012/0074704 A1 * | 3/2012 | Rooney | ................... | F03B 13/10 |
| | | | | 290/54 |
| 2012/0292911 A1 * | 11/2012 | Bolin | ...................... | F03B 17/061 |
| | | | | 114/294 |
| 2013/0213289 A1 * | 8/2013 | Borden | ................... | F03D 13/25 |
| | | | | 114/182 |
| 2013/0239861 A1 * | 9/2013 | Gizara | ..................... | H02P 9/04 |
| | | | | 114/274 |
| 2015/0027125 A1 * | 1/2015 | Raj | ........................ | F03D 9/007 |
| | | | | 60/720 |
| 2015/0298806 A1 * | 10/2015 | Vander Lind | ............ | B64D 3/00 |
| | | | | 290/55 |
| 2016/0115937 A1 * | 4/2016 | Pettersson | ............. | B64C 39/022 |
| | | | | 290/43 |
| 2016/0273519 A1 * | 9/2016 | Vander Lind | ......... | B64C 39/022 |
| 2016/0297506 A1 * | 10/2016 | Duckworth | ................ | B63J 3/04 |
| 2017/0110883 A1 * | 4/2017 | Tabe | ....................... | F03B 13/26 |
| 2017/0175713 A1 * | 6/2017 | Barber | .................... | F03D 13/25 |
| 2017/0363068 A1 * | 12/2017 | Hart | ....................... | F03D 13/20 |
| 2022/0389904 A1 * | 12/2022 | Reiners | .................... | F03D 5/00 |
| 2024/0011459 A1 * | 1/2024 | Annal | ................... | F03B 17/061 |

FOREIGN PATENT DOCUMENTS

| | | | | |
|---|---|---|---|---|
| EP | 2194264 A1 * | 6/2010 | ............... | B63J 3/02 |
| FR | 2414442 A1 | 8/1979 | | |
| WO | WO-2007027544 A1 * | 3/2007 | ............... | B63B 1/24 |
| WO | 2008047963 A1 | 4/2008 | | |

* cited by examiner

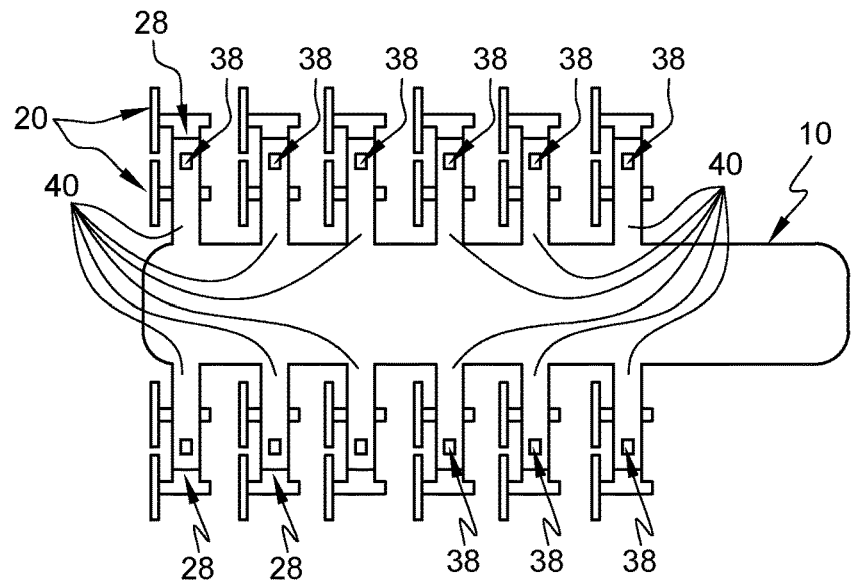
Fig. 4
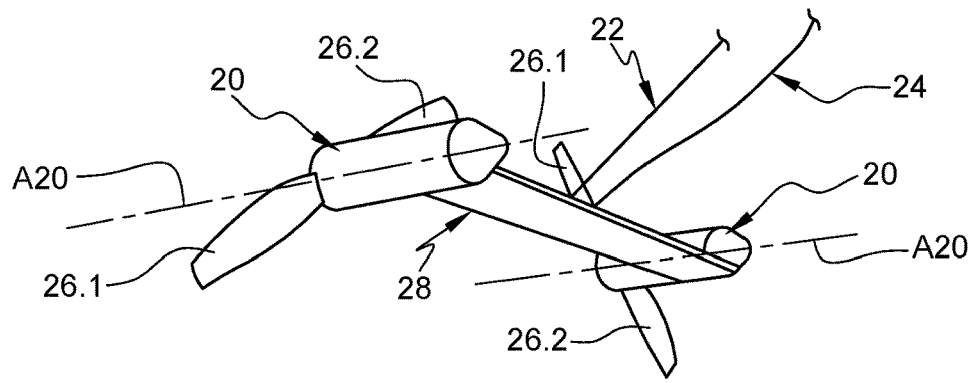
Fig. 5
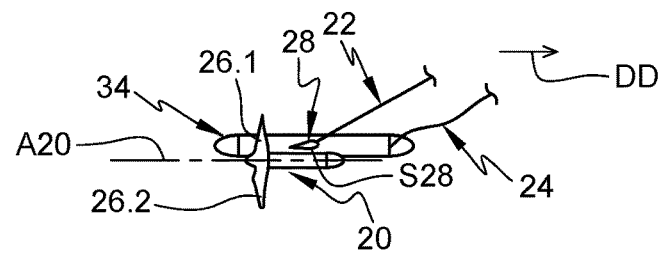
Fig. 6
Fig. 7
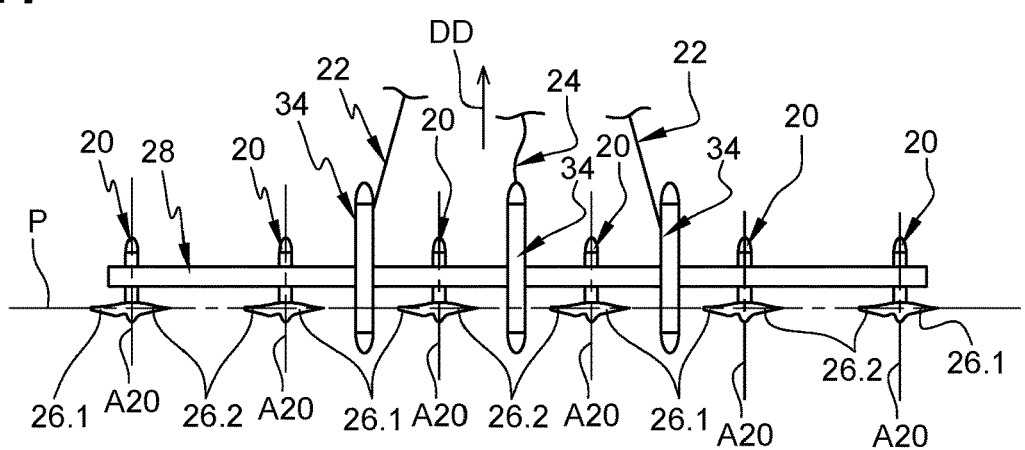

DEVICE FOR GENERATING POWER, COMPRISING AN AIR-TOWED VESSEL TOWING AT LEAST ONE WATER CURRENT TURBINE

CROSS-REFERENCES TO RELATED APPLICATIONS

This application claims the benefit of the International Application No. PCT/EP2021/062948, filed on May 17, 2021, and of the French patent application No. 2005655 filed on May 28, 2020, the entire disclosures of which are incorporated herein by way of reference.

FIELD OF THE INVENTION

The present application relates to a device for producing energy, having an air-towed vessel towing at least one water current turbine.

BACKGROUND OF THE INVENTION

According to a known embodiment described in the document WO2008047963, a device for producing electrical energy comprises a vessel towed by at least one kite and a water current turbine secured under the hull of the vessel. According to this embodiment, the kite uses the high-altitude winds, which are strong and stable, to move the vessel, the water current turbine secured under the vessel producing electrical energy.

This embodiment makes it possible to produce electrical energy at low cost. However, the quantity of energy produced is relatively low.

The present invention seeks to remedy all or some of the drawbacks of the prior art.

SUMMARY OF THE INVENTION

To this end, a subject of the invention is a device for producing energy, having an air-towed vessel and at least one water current turbine linked to the vessel by at least one electric cable, characterized in that the water current turbine is linked to the vessel by at least one mechanical linking cable in order to be towed by the vessel.

According to the invention, the water current turbine is at a distance from the vessel, making it possible to increase its diameter and to reduce the interactions between the water current turbine and the vessel. Moreover, it is possible to provide a large number of water current turbines towed by a single vessel. Increasing the diameter and the number of water current turbines makes it possible to increase the quantity of energy produced.

According to another feature, the device for producing energy comprises at least one support, linked to the vessel by a mechanical linking cable, to which at least two water current turbines are secured.

According to a first embodiment, the support extends along a transverse direction, perpendicular to a direction of movement in operation, the water current turbines connected to the support being positioned in one and the same transverse plane, perpendicular to the direction of movement.

According to a second embodiment, the support extends along a longitudinal direction, parallel to a direction of movement in operation, the water current turbines connected to the support being distributed in at least two groups, the water current turbines of a first group being positioned in a first transverse plane, perpendicular to the direction of movement, the water current turbines of a second group being positioned in a second transverse plane, perpendicular to the direction of movement, the second transverse plane being parallel to and at a distance from the first plane.

According to one arrangement, the water current turbines of one and the same support have axes of rotation positioned around the support.

According to further features, the device for producing energy comprises:
  at least one system for controlling the pitch of at least one water current turbine and/or of at least one support connecting at least two water current turbines;
  at least one ballast, connected to the water current turbine and/or to a support connecting at least two water current turbines, making it possible to modify their buoyancy;
  at least one autonomous movement system, connected to a water current turbine and/or to a support connecting at least two water current turbines, which is configured to control the movements of the water current turbine and/or of the support;
  a system for managing the movements and/or positions of the water current turbines and/or of the supports connecting at least two water current turbines;
  at least one winch configured to wind up or unwind at least one mechanical linking cable of at least one water current turbine and/or of at least one support connecting at least two water current turbines.

According to another feature, at least one water current turbine comprises at least two sets of blades, the blades of different sets having counter-rotating rotational movements.

According to another feature, the vessel comprises a system for converting the electrical energy produced by each towed water current turbine into hydrogen and/or synthetic fuel and/or any other energy.

According to another feature, the vessel comprises at least one flexible wing, a system for controlling the flexible wing, suspended under the flexible wing, and a wind turbine connected to the control system to supply it with electrical energy.

According to another feature, the vessel is configured to move from upstream to downstream, and the device for producing energy comprises at least one wing positioned downstream of the vessel, a control system configured to modify at least one characteristic of the wing, and a system for determining at least one characteristic of the wind upstream of the vessel, the control system being configured to modify at least one characteristic of the wing depending on the characteristic of the wind determined by the determining system.

According to another feature, the device for producing energy comprises a wing having at least one semi-rigid or rigid first part and at least one second part that is movable with respect to the first part between more or less overlapping positions, each second part being configured to take up at least:
  a retracted state, corresponding to a minimum size of the wing, intended for stowing the wing on the vessel; and
  a deployed state, intended for using the wing in flight.

According to another feature, the vessel comprises a plurality of wings and at least one handling system configured to grasp a wing and raise it so that it can fly, the manipulating system comprising at least one gripper intended to cooperate with a gripping point of a semi-rigid or rigid part of the wing.

The invention also relates to a method for producing energy, which comprises the following steps:

taking a device for producing energy as mentioned above;
setting the air-towed vessel in motion on a body of water;
unwinding the at least one mechanical linking cable such that the vessel tows the at least one water current turbine at a distance from the vessel;
collecting and storing on the vessel the energy originating from electricity produced by the at least one water current turbine.

The invention also relates to energy produced using the abovementioned method for producing energy.

BRIEF DESCRIPTION OF THE DRAWINGS

Other features and advantages will become apparent from the following description of the invention, which description is given solely by way of example, with reference to the appended drawings, in which:

FIG. 4 is a schematic depiction from above of the device for producing energy shown in FIG. 2, during a maintenance phase, FIG. 5 is a perspective view of a towed pair of water current turbines, illustrating one embodiment of the invention, FIG. 6 is a side view of a group of water current turbines, illustrating a first embodiment of the invention, FIG. 7 is a view from above of the group of water current turbines shown in FIG. 6.

DETAILED DESCRIPTION OF THE PREFERRED EMBODIMENTS

Figure 1:
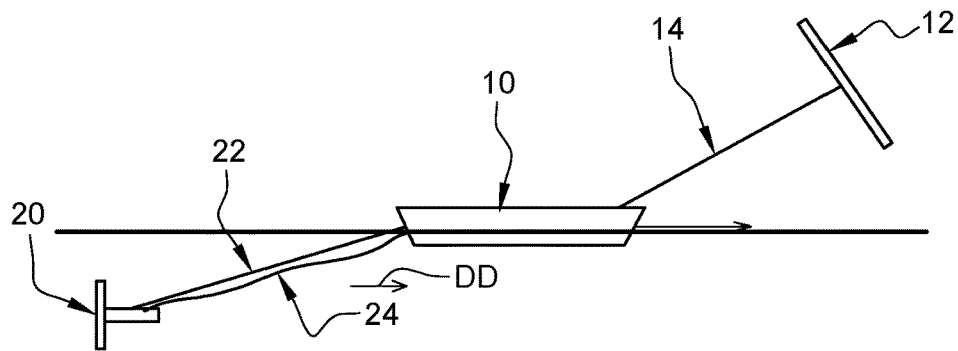
FIG. 1 is a schematic depiction from the side of a device for producing energy, illustrating one embodiment of the invention.

According to one embodiment, shown in FIGS. 1 to 4, 8 and 11 to 13, a device for producing energy comprises an air-towed vessel 10. A vessel is understood to be any structure that is able to move on the surface of the water or close to the surface of the water. The term air-towed is understood to mean a vessel 10 towed by at least one wind-propelled element.

An air-towed vessel 10 comprises at least one flexible wing 12, also referred to as a traction kite, and at least one cable 14, also referred to as a line, linking the flexible wing 12 and the vessel 10. Generally, a plurality of lines 14 are linked to each flexible wing 12. According to a configuration shown in FIG. 13, the air-towed vessel 10 comprises a control system 16 configured to control the flexible wing 12, suspended under the flexible wing 12. The control system 16 is linked to the vessel 10 by a main cable 14 and to the flexible wing 12 by a plurality of lines 14'.

The flexible wings 12 are preferred for towing the vessel 10 since they use the strong and stable winds that are present at altitude.

The flexible wing 12, the cables and lines 14, 14' and the control system 16 are not described further since they are known to those skilled in the art and described for example in the document WO2019179924.

Figure 13:
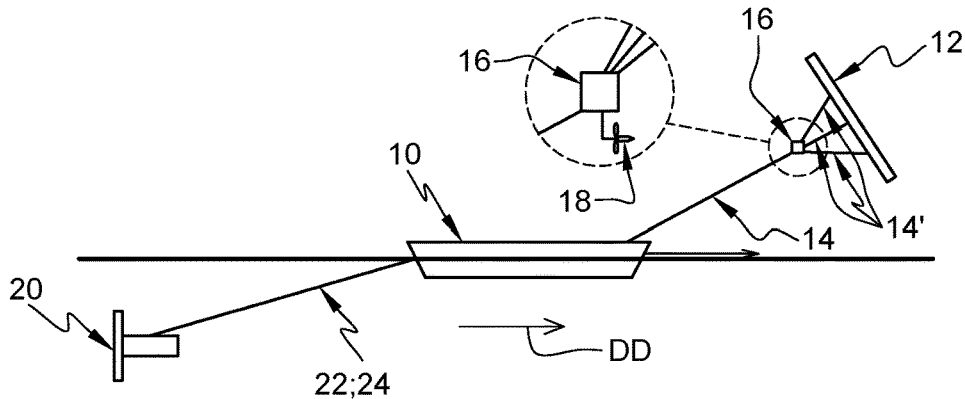
FIG. 13 is a schematic depiction from the side of a device for producing energy, illustrating another embodiment of the invention.

According to one embodiment, shown in FIG. 13, a wind turbine 18 is connected to the control system 16 to supply it with electrical energy. This wind turbine 18 may be identical to ram air turbine (or RAT) present on certain aircraft. The control system 16 may comprise a battery for storing the electrical energy in addition to the wind turbine 18. This wind turbine 18 makes it possible to do away with an electric linking cable between the vessel 10 and the control system 16.

Of course, the invention is not limited to the above-described embodiments for the air-towed vessel 10.

The vessel 10 moves along a direction referred to as the direction of movement DD when it is towed. To produce energy, the air-towed vessel 10 is set in motion on a body of water.

The device for producing energy comprises at least one water current turbine 20 that is submerged in the water, towed by the vessel 10 and connected to the vessel 10 by at least one mechanical linking cable 22 that reacts the mechanical loads between the vessel 10 and the water current turbine 20 and by at least one electric cable 24 for transferring the electrical energy produced by the water current turbine 20 to the vessel 10. In contrast to the prior art, the water current turbine 20 is not connected to the vessel 10 by a rigid mechanical link.

The mechanical linking cable 22 has a length greater than 10 m, or even 100 m, in order that the water current turbine 20 is at a distance from the vessel 10. The mechanical linking cable 22 may have a length of around 100 meters, or even of a kilometer.

The electric cable 24 and the mechanical linking cable 22 may be separate or combined in a single bundle 25.

According to a first embodiment, the vessel 10 comprises a system for storing electrical energy.

According to a second embodiment, the vessel 10 comprises a system for converting the electrical energy produced by the water current turbine or turbines into a different type of energy. By way of example, the electrical energy may be converted, by electrolysis, into hydrogen, which may be used to produce a synthetic fuel by way of a chemical process of catalyzing carbon monoxide and hydrogen.

The first and second embodiments may be combined. Irrespective of the embodiment, the device for producing energy may produce electricity and/or hydrogen and/or synthetic fuel and/or any other energy.

According to one embodiment, shown in FIGS. 5 and 6, each water current turbine 20 has an axis of rotation A20, at least two blades 26.1, 26.2 pivoting about the axis of rotation A20, and a generator for converting the mechanical energy of the axis of rotation A20 into electrical energy. Each water current turbine 20 has a profile allowing it to reduce its aerodynamic coefficient.

According to one configuration, at least one water current turbine 20 comprises at least two sets of blades 26.1, 26.2, a first set of blades positioned in a first plane perpendicular to the axis of rotation A20, and a second set of blades positioned in a second plane parallel to and at a distance from the first plane, the blades of the first and second sets having counter-rotating rotational movements in order to limit the occurrence of a disruptive moment.

According to one design, each water current turbine 20 has a diameter greater than or equal to 4 m, the diameter of the water current turbine being equal to that of the circle described by the ends of the blades. According to one configuration, each water current turbine 20 has a diameter of around 8 m, or even 20 m. Such diameters are conceivable since the water current turbine 20 is at a distance from the vessel 10 and linked to the latter by a mechanical linking cable 22.

According to the variants, the water current turbines 20 may be isolated from one another or grouped together at least in twos.

To this end, the device for producing energy comprises at least one support 28, to which at least two water current turbines 20 are secured, and which is linked to the vessel 10 by a mechanical linking cable 22.

According to one embodiment, shown in FIGS. 2 to 5, each support 28 supports two water current turbines 20. The support 28 and the water current turbines 20 are configured such that the center-to-center spacing between the two water current turbines 20 is greater than or equal to 1.5 times the diameter of the water current turbines 20. When the water current turbines 20 have a diameter of around 8 m, the center-to-center spacing is around 12 m. When the water current turbines 20 have a diameter of around 20 m, the center-to-center spacing is around 30 m.

Figure 10:
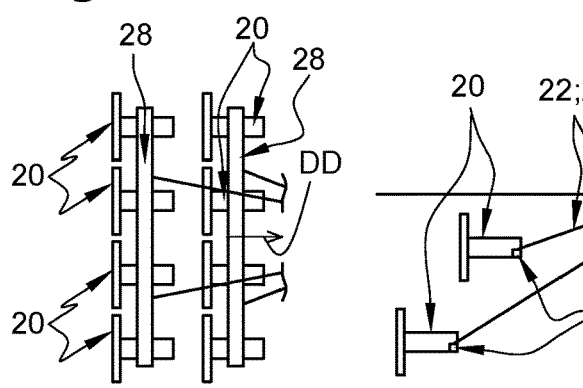
FIG. 10 is a schematic depiction from above of groups of water current turbines, illustrating a fourth embodiment of the invention.

According to embodiments that are shown in FIGS. 6, 7 and 10, a single support 28 may support more than two water current turbines 20. According to a first example, illustrated in FIG. 7, six water current turbines 20 are attached to the support 28. According to a second example, illustrated in FIG. 8, four water current turbines are attached to the support 28.

Figure 9:
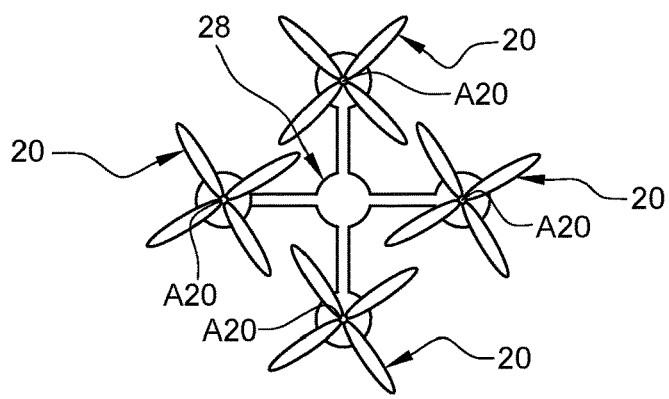
FIG. 9 is a rear view of a group of water current turbines, illustrating a third embodiment of the invention.

The water current turbines 20 of one and the same support 28 have mutually parallel axes of rotation A20. According to a first configuration, the axes of rotation A20 of the water current turbines 20 of one and the same support 28 are positioned in one and the same plane, which is substantially horizontal when the water current turbines 20 are towed by the vessel 10. According to another configuration, shown in FIG. 9, the axes of rotation A20 of the water current turbines 20 of one and the same support 28 are positioned around the support 28. By way of example, they may be distributed regularly in a circle surrounding the support 28.

The device for producing energy may comprise a single support 28 or a plurality of supports 28 towed by one and the same vessel 10.

According to a first configuration, shown in FIG. 7 for example, the support 28 extends along a transverse direction, perpendicular to the direction of movement DD in operation, and the water current turbines 20 connected to the support 28 are positioned in one and the same transverse plane, perpendicular to the direction of movement DD. Water current turbines 20 are considered to be positioned in one and the same transverse plane when the blades 26.1, 26.2 of the water current turbines 20 pivot in one and the same transverse plane P.

According to this first configuration, the support 28 has a cross section S28 with an airfoil profile having a low hydrodynamic coefficient, a cross section corresponding to a section in a plane containing the vertical direction and the direction of movement. This configuration makes it possible to reduce the losses caused by the drag of the support 28.

Figure 8:
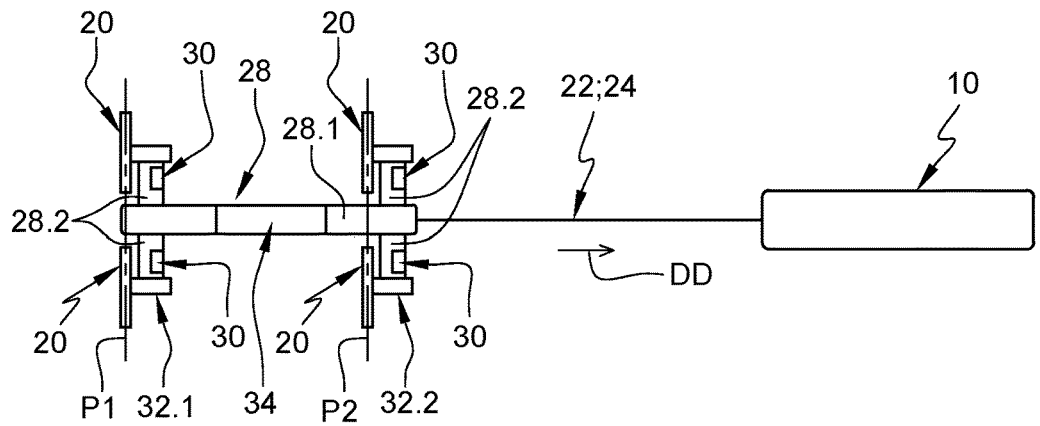
FIG. 8 is a schematic depiction from above of a group of water current turbines, illustrating a second embodiment of the invention.

According to a second configuration, shown in FIG. 8, the support 28 extends along a longitudinal direction, parallel to the direction of movement DD in operation, and the water current turbines 20 connected to the support 28 are distributed in at least two groups 32.1, 32.2, the water current turbines 20 of a first group 32.1 being positioned in a first transverse plane P1, perpendicular to the direction of movement DD, the water current turbines 20 of a second group 32.2 being positioned in a second transverse plane P2, perpendicular to the direction of movement DD, the second transverse plane P2 being parallel to and at a distance from the first plane P1.

According to this second configuration, the support 28 comprises an approximately tubular body 28.1 which extends along the longitudinal direction and, for each water current turbine 20, an arm 28.2 which extends perpendicularly to the longitudinal direction, connecting the body 28.1 and the water current turbine 20, having a cross section with an airfoil profile.

According to one embodiment, shown in FIG. 8, the device for producing energy comprises at least one system for controlling the pitch of at least one water current turbine 20 and/or of at least one support 28 connecting at least two water current turbines 20. According to one configuration, at least one support 28 comprises at least one mobile part 30, the position of which can be modified by the pitch control system in order for it to be possible to control the descent or the ascent of the support 28. Modifying the position of the mobile part 30 also makes it possible to modify the aerodynamic coefficient of the support 28, in particular its drag.

According to one embodiment, the device for producing energy comprises at least one ballast 34 connected to a water current turbine 20 and/or to a support 28, making it possible to modify their buoyancy. According to a first configuration, shown in FIG. 8, the ballast 34 is integrated in the support 28, for example into its body 28.1. According to a second configuration, shown in FIGS. 6 and 7, the ballast 34 is an element separate from the support 28, secured to the support 28.

According to one design, all the supports 28 comprise at least one ballast 34.

Figure 11:
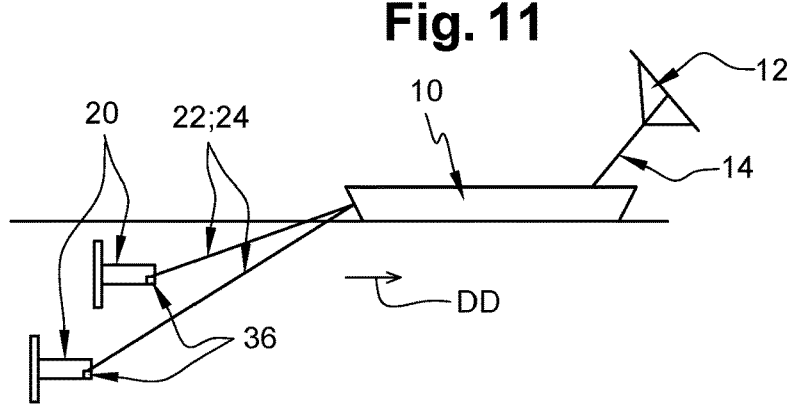
FIG. 11 is a schematic depiction from the side of the groups of water current turbines shown in FIG. 10, during an energy production phase.
Figure 12:
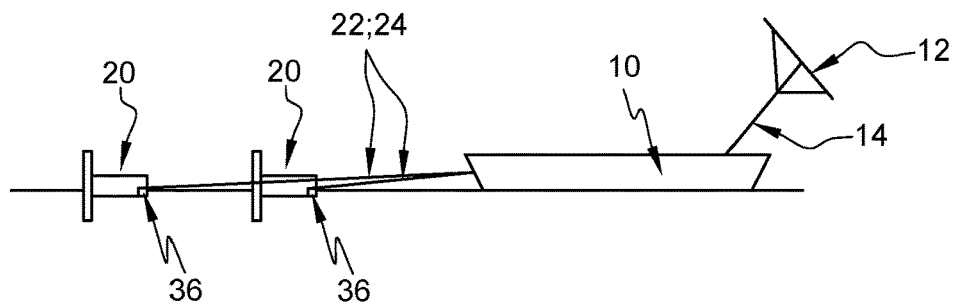
FIG. 12 is a schematic depiction from the side of the groups of water current turbines shown in FIG. 10, during a maintenance phase.

According to one embodiment, shown in FIGS. 11 and 12, the device for producing energy comprises at least one autonomous movement system 36 connected to a water current turbine 20 and/or to a support 28 and configured to control the movements of the water current turbine 20 and/or of the support 28 in an approximately horizontal plane, such as a propeller motor, for example.

Figure 2:
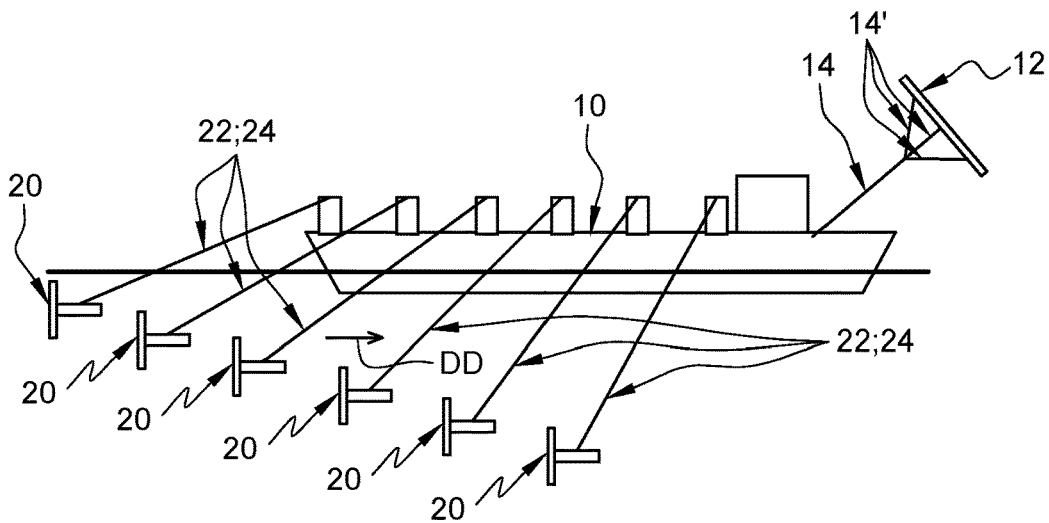
FIG. 2 is a schematic depiction from the side of a device for producing energy, illustrating another embodiment of the invention.
Figure 3:
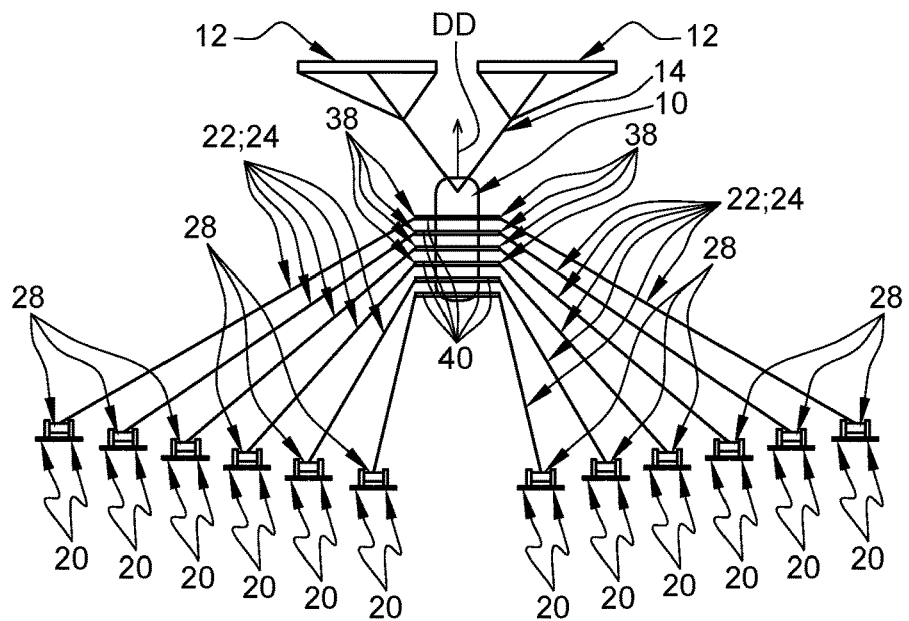
FIG. 3 is a schematic depiction from above of the device for producing energy shown in FIG. 2, during an energy production phase.

According to one embodiment, shown in FIGS. 2 to 4, each water current turbine 20 is configured to take up a position at a distance from the vessel 10, as illustrated in FIGS. 2 and 3, corresponding, in particular, to an energy production phase, and a position close to the vessel 10, as illustrated in FIG. 4, corresponding in particular to a maintenance phase.

To this end, the device for producing energy comprises at least one winch 38 configured to wind up or unwind at least one mechanical linking cable 22 of at least one water current turbine 20 and/or of at least one support 28.

According to one embodiment, the vessel 10 comprises a plurality of arms 40, one for each water current turbine 20, which extend along a transverse direction (perpendicular to the direction of movement DD), on either side of the vessel 10. The arms 40 are disposed symmetrically on either side of the vessel 10. Each of them supports a winch 38 on which a mechanical linking cable 22 is wound up and unwound. During an energy production phase, as illustrated in FIG. 3, the mechanical linking cables 22 are unwound and the water current turbines 20 are at a distance from the vessel 10. During a maintenance phase, as illustrated in FIG. 4, the mechanical linking cables 22 are wound up and the water current turbines 20 are positioned under the arms 40 in the vicinity of the vessel 10, helping to improve their accessibility.

When there are a plurality of separate water current turbines 20 and/or a plurality of supports 28, the device for producing energy comprises a system for managing the movements and/or positions of the separate water current turbines 20 and/or of the supports 28, in order to avoid collisions between them or with the vessel 10, by acting on the systems for controlling the ballasts 34, the autonomous movement systems 36, the winches 38 and/or the pitch control systems.

During a production phase, the depth of the water current turbines 20 or of the supports 28 is adjusted depending on the tractive force of the vessel 10, on their drag and on their weight. It is possible to individually modify the depth of each separate water current turbine 20 and/or of each support 28 by controlling their ballast 34 and/or their pitch.

The presence of a plurality of water current turbines 20 makes it possible to increase the quantity of energy produced.

The fact that the water current turbines 20 are at a distance from the vessel 10 and from one another makes it possible to increase their diameter and to limit the interactions between one another or with the vessel 10.

Since the water current turbines 20 are not secured to the vessel 10, they can be submerged at significant depths, during a production phase, making it possible to operate in regions in which the impact of swell is reduced and in which there is less floating debris. Since the water current turbines are not attached to the hull of the vessel, the draft of the vessel can be reduced, making it easier to access shallow harbors.

Figure 14:
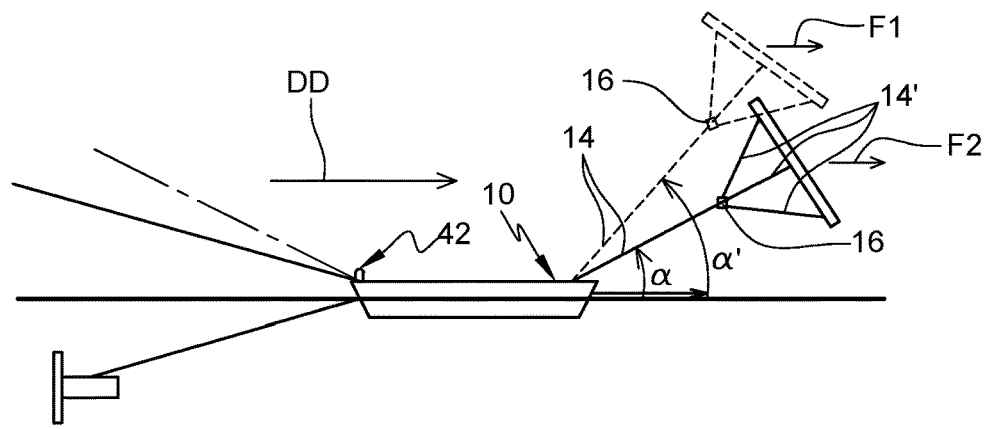
FIG. 14 is a schematic depiction from the side of an air-towed vessel equipped with a system for determining at least one characteristic of the wind, illustrating one embodiment of the invention.

According to one embodiment, shown in FIG. 14, the vessel 10 moves from upstream to downstream, along the direction of movement DD. This vessel 10 is air-towed by at least one wing 12, positioned downstream of the vessel 10, linked by lines 14' to a control system 16, itself linked to the vessel 10 by a main cable 14. This control system 16 is configured to modify at least one characteristic of the wing 12, such as its orientation and/or the inclination of its main cable 14, for example.

The vessel 10 comprises a system 42 for determining at least one characteristic of the wind upstream of the vessel 10, the control system 16 being configured to modify at least one characteristic of the wing 12 depending on the characteristic of the wind determined by the determining system 42.

According to one configuration, the determining system 42 is a laser or lidar remote sensing system oriented in the upstream direction of the vessel 10.

If a gust of wind is not detected by the determining system 42, the wing 12 is controlled by the control system 16 such that the main cable 14 forms an angle $\alpha$ with respect to the horizontal. The wing 12 then exerts a tractive force F1 on the vessel 10 via the main cable 14.

When a gust of wind is detected by the determining system 42, the wing 12 is controlled by the control system 16 such that the main cable 14 forms an angle $\alpha'$, greater than $\alpha$, with respect to the horizontal. The wing 12 then exerts a tractive force F2 on the vessel 10 via the main cable 14. Since the angle $\alpha'$ is greater than the angle $\alpha$, the force F2 is lower than the force F1, allowing the wing 12 and the main cable 14 to be stressed less when a gust of wind reaches the wing 12 and consequently making it possible to reduce the risk of deterioration of the wing 12 and of the main cable 14.

Figure 15:
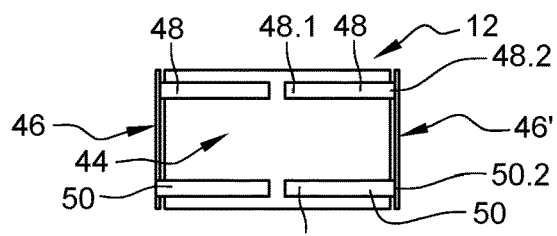
FIG. 15 is a schematic depiction of a telescopic wing in the retracted state, illustrating one embodiment of the invention.
Figure 16:
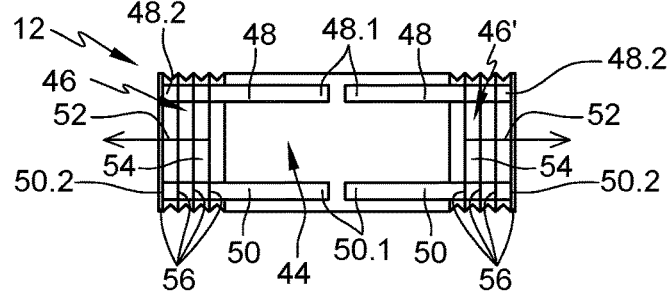
FIG. 16 is a schematic depiction of the telescopic wing shown in FIG. 15, in the course of deployment.
Figure 17:
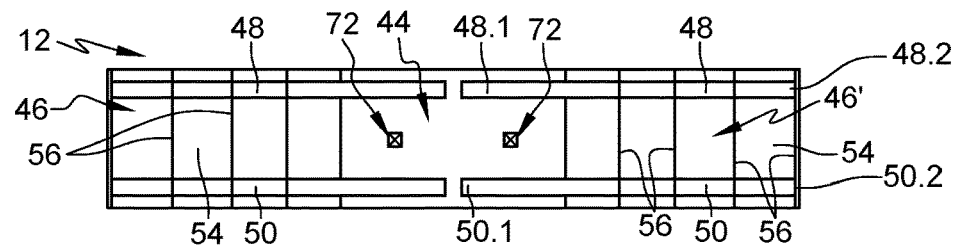
FIG. 17 is a schematic depiction of the telescopic wing shown in FIG. 15, in the deployed state.

According to one embodiment, shown in FIGS. 15 to 17, the wing 12 is semi-rigid or rigid. This solution makes it possible to obtain a wing 12 that exhibits a greater lift-to-drag ratio than a flexible wing 12. A semi-rigid or rigid wing 12 can supply a power of 25 kW/m$^2$ for a wind speed of 10 m/s (as opposed to only around 8 kW/m$^2$ for a conventional flexible wing).

In order to reduce its size when it is not in use, the vessel 10 comprises at least one wing 12 having at least one first, semi-rigid or rigid part 44 and at least one second part 46 that is movable with respect to the first part 44 between more or less overlapping positions. According to one configuration, the semi-rigid or rigid wing 12 comprises a first, central semi-rigid or rigid part 44 and two movable second parts 46, 46' disposed on either side of the first, central part 44, each of the second parts 46, 46' being configured to take up a retracted state, shown in FIG. 15, in which the second part 46, 46' is partially housed in the first part 44 or superposed on the first part 44, and a deployed state, shown in FIG. 17, in which the second part 46, 46' is positioned outside the first part 44 or is offset with respect to the first part 44. The retracted state corresponds to a minimum size of the wing. Thus, the second parts are positioned in the retracted state such that the wing can be stowed on the vessel, making it easier to stow the wing and minimize the space required for stowing it. The deployed state is intended for using the wing in flight.

According to one embodiment, each second part 46, 46' comprises two telescopic arms 48, 50 which each have a first end 48.1, 50.1 secured to the first part 44 and a second end 48.2, 50.2 configured to move along a deployment direction 52 between a position close to the first end 48.1, 50.1, corresponding to the retracted state, and a second position at a distance from the first end 48.1, 50.1, corresponding to the deployed state. According to a first configuration, the telescopic arms 48, 50 are positioned partially inside the first, semi-rigid or rigid part 44. According to a second configuration, the telescopic arms 48, 50 are partially pressed against an outer face of the first, semi-rigid or rigid part 44.

Each second part 46, 46' comprises a web 54, which is connected to the telescopic arms 48, 50, folded up in the retracted state and taut in the deployed state.

According to one embodiment, the web 54 is connected to the telescopic arms 48, 50 via rods 56 perpendicular to the telescopic arms 48, 50, which may be made of metal or of composite material.

According to one configuration, the first, semi-rigid or rigid part 44 and the second parts 46, 46' are linked to a control system by a plurality of lines.

To give an order of magnitude, the wing 12 has a width (dimension measured perpendicularly to the deployment direction 52) of around 20 m and a length (dimension measured parallel to the deployment direction 52) of around 35 m in the retracted state and around 100 m in the deployed state when there are two second parts 46, 46' disposed on either side of a first part 44.

According to one embodiment, shown in FIGS. 18 to 23, the air-towed vessel 10 comprises a plurality of wings 12 and at least one handling system 58 configured to grasp a wing 12 and raise it so that it can fly. According to one design, the handling system 58 is also configured to grasp the wing 12 in flight and set it down on the vessel 10.

According to one configuration, the handling system 58 comprises a robotic arm having a base 60 connected to the vessel 10 by a first joint 62, a segment 64, a first end 64.1 of which is connected to the base 60, a head 66 configured to be temporarily secured to at least one wing 12, and a second joint 68 connecting the head 66 to the second end 64.2 of the segment 64.

According to one configuration, the first joint 62 comprises a vertical pivot axis and a horizontal pivot axis. The second joint 68 comprises at least two mutually orthogonal pivot axes. The segment 64 is telescopic.

For each wing 12, the vessel 10 comprises a winch 70 secured to the vessel 10, a main cable 14, and a control system 16 linked to the winch 70 by the main cable 14 and to the wing 12 by lines 14'.

As illustrated in FIG. 17, each wing 12 comprises at least one gripping point 72 to which the head 16 can be temporarily connected. This gripping point 72 is preferably disposed on a semi-rigid or rigid part 44 of the wing. According to one configuration, the head 66 comprises two grippers 74 intended to cooperate with two gripping points 72 positioned on the fixed part 44 of the semi-rigid or rigid wing 12. Each wing 12 may comprises a part that is or is not telescopic.

Figure 18:
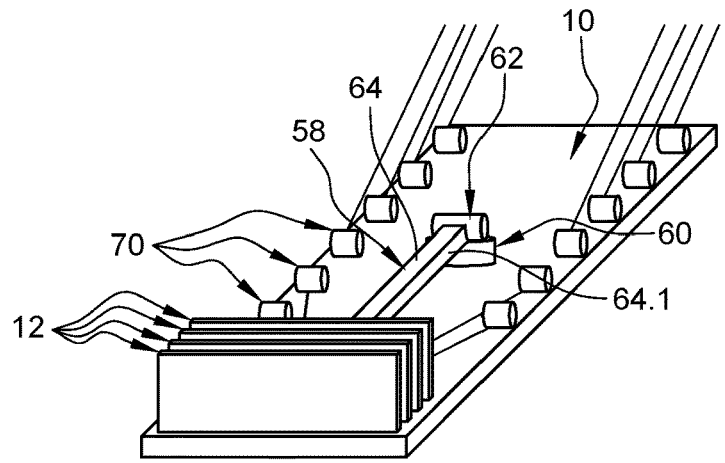
FIG. 18 is a schematic depiction of an air-towed vessel equipped with a system for handling a wing during a step of grasping a wing.
Figure 19:
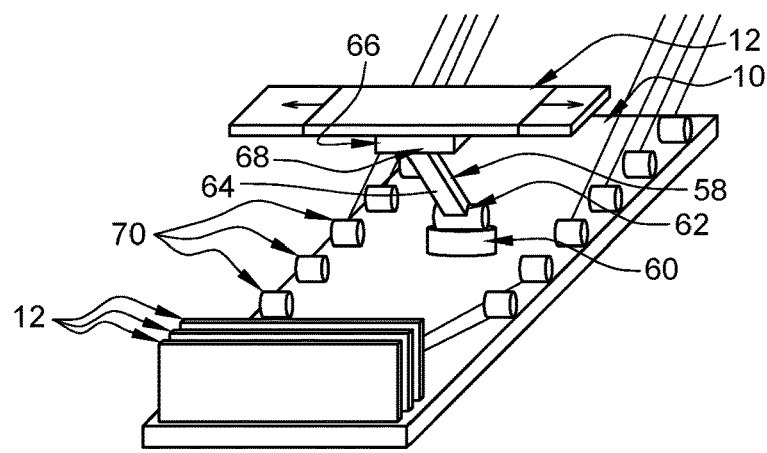
FIG. 19 is a schematic depiction of the air-towed vessel shown in FIG. 18, during a step of deploying the wing.
Figure 20:
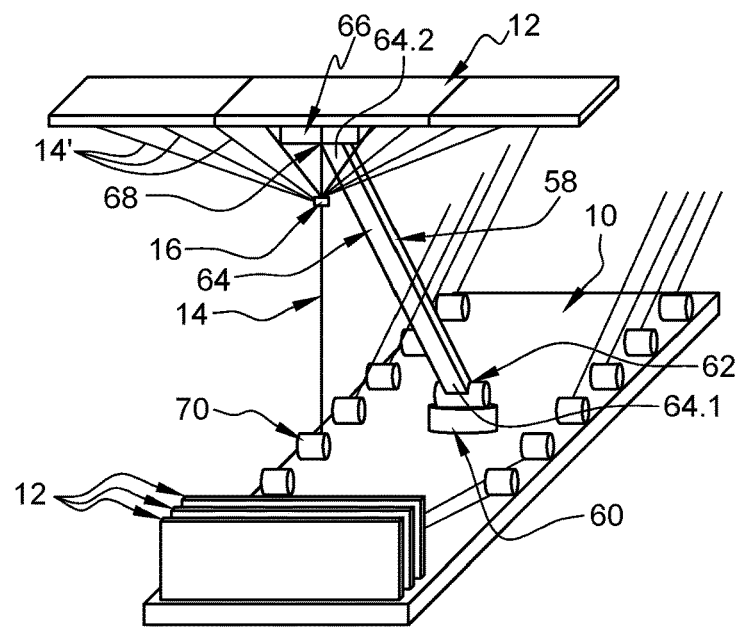
FIG. 20 is a schematic depiction of the air-towed vessel shown in FIG. 18, during a step of raising the wing in the deploying state using the handling system.

According to one operating approach, the wings 12 are stored vertically on the vessel 10, as illustrated in FIG. 18. During a grasping step, the head 66 of the handling system 58 is connected to the wing 12. Before a deployment step, shown in FIG. 19, the wing 12 is raised and oriented by the handling system 58. After the step of deploying the wing, the handling system 58 lifts the wing 12 so that it can be caught by the wind during a lifting step, as illustrated in FIG. 20. Next, the wing 12 is detached from the handling system 58 and flies.

To make it easier to couple the grippers 74 of the head 66 to the gripping points 72, the wing 12 comprises a guide cable 76 for each gripping point 72, linking the control system 16 and the wing 12 and linked to the wing 12 in the vicinity of the gripping point 72.

Figure 21:
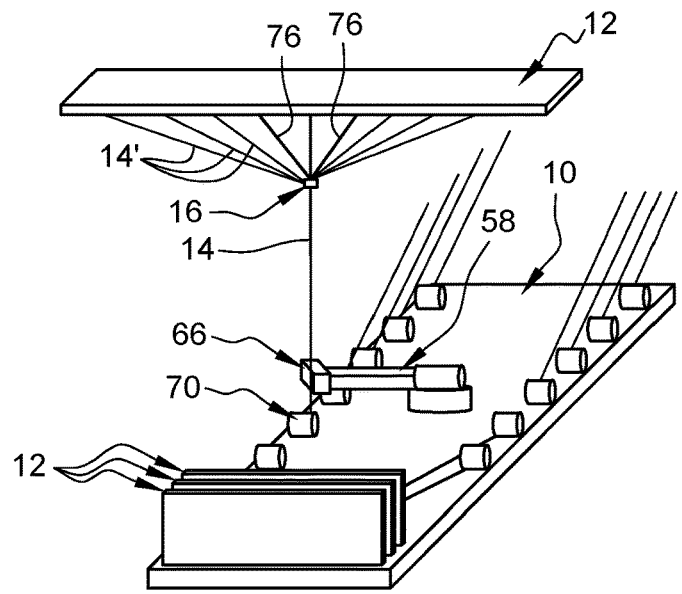
FIG. 21 is a schematic depiction of the air-towed vessel shown in FIG. 18, during a step of grasping a main cable of a wing in flight by the handling system.
Figure 22:
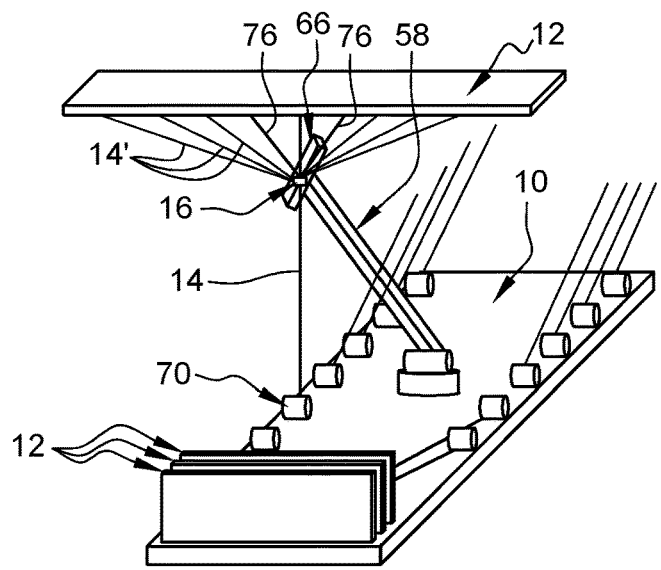
FIG. 22 is a schematic depiction of the air-towed vessel shown in FIG. 18, during a step of grasping a guide cable of a wing in flight by the handling system.
Figure 23:
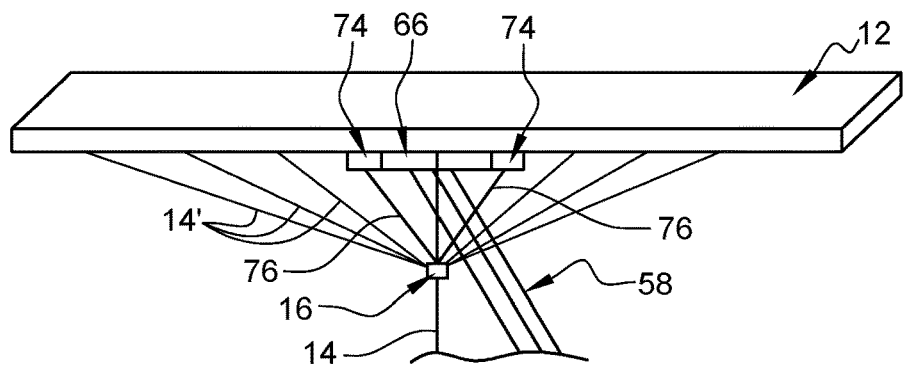
FIG. 23 is a schematic depiction of the air-towed vessel shown in FIG. 18, during a step of grasping a wing in flight by the handling system.

To recover the wing 12 and set it down on the vessel 10, the winch 70 is actuated such that the wing 12 is within the reach of the head 66 of the handling system 58, as illustrated in FIG. 21. Next, the head 66 is guided to the gripping points 72. First, the head 66 grasps the main cable 14 in the vicinity of the winch 70, as illustrated in FIG. 21. Next, the head 66 is moved until it reaches the control system 16 and then until it simultaneously grasps the main cable 14 and a first guide cable 76, as illustrated in FIG. 22. The head 66 then releases the main cable 14 and grasps the second guide cable 76, and then it is moved along the guide cables 76 until it comes into contact with the wing 12 in order that the grippers 74 can grasp the gripping points 72, as illustrated in FIG. 23. In a variant, the wing 12 is moved using the winch 70 until the head 66 is in contact with the wing 12 and the grippers 74 can grasp the gripping points 72. The wing 12 is then moved by the handling system 58 to its storage area on the vessel 10.

According to one particular embodiment, which is not shown in the figures, the air-towed vessel 10 comprises an inflatable wing. This inflatable wing comprises an envelope intended to be filled with a gas that is lighter than air, such as helium, for example. It also comprises a filling device intended to allow the filling (or the purging) of the envelope with this gas. When the inflatable wing is not being used to tow the vessel, the envelope can be folded up and stowed in an appropriate space provided on the vessel. The deployment of the wing in order to use it to tow the vessel is easier compared with a non-inflatable wing. This is because, during such a deployment, the envelope previously linked to the vessel by a towing cable, is inflated with the gas that is lighter than air, via the filling device. The towing cable is preferably wound up on a winch. The cable comprises a free length between the winch and the inflatable wind so as to allow the inflatable wing to be inflated, the inflatable wing then being kept in the vicinity of the vessel. Once the inflatable wing has been fully inflated, the inflatable wing remains in the air in the vicinity of the vessel, autonomously, given that its envelope has been filled with a gas that is lighter than air. No handling system is necessary for the deployment of the wing: all that is necessary for this purpose is to unwind the cable wound up on the winch. Similarly, to recover the wing in order to stow it on the vessel, all that is necessary is to wind the cable back up on the winch and then to empty the gas contained in the envelope when the wing is close enough to the vessel. The lack of a need for a system for handling the wing is very advantageous since such a system is expensive and bulky. It is all the more advantageous in the case of a vessel that forms part of a system for producing energy, since the operations of deploying and recovering a wing are then less frequent compared with the towing time of the vessel by this wing. Once inflated, on account of the pressure of the gas contained in the envelope, the wing exhibits greater rigidity than a flexible wing, similar to the rigidity of a rigid or semi-rigid wing, thereby giving the inflatable wing improved aerodynamic performance. Such an inflatable wing can be controlled by means of a control system such as the abovementioned control system 16 (acting on suspension cables of the wing to modify its shape), or by means of movable control surfaces (for example semi-rigid control surfaces).

In a variant of the abovementioned particular embodiment, a water current turbine (or a set of water current turbines) is towed directly by the inflatable wing (or by a set of inflatable wings), without requiring the use of a vessel. This is made possible by the fact that this type of wing does not require a handling system in order to be deployed and recovered. Advantageously, the water current turbine (or the set of water current turbines) then comprises a body in which the system for converting the electrical energy produced by the water current turbine into hydrogen and/or into synthetic fuel and/or into any other type of energy is installed. A system for controlling the inflatable wing (or the set of inflatable wings) can also be installed in the body of the water current turbine. In particular, this body is submerged when the water current turbine is submerged during its operation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for producing energy comprising:
    an air-towed vessel,
    at least one water current turbine linked to the vessel by at least one electric cable, the at least one water current turbine being linked to the vessel by at least one mechanical linking cable to be towed by the vessel,
    at least one support, linked to the vessel by one of the at least one mechanical linking cable, to which at least two of the water current turbines of the at least one water current turbine are secured, and
    a system for managing at least one of movements or positions of at least one of the at least one water current turbine or the supports connecting at least two of the water current turbines.

2. The device for producing energy as claimed in claim 1, wherein the support extends along a transverse direction, perpendicular to a direction of movement in operation, the water current turbines connected to the support being positioned in one and the same transverse plane, perpendicular to the direction of movement.

3. The device for producing energy as claimed in claim 1, wherein the support extends along a longitudinal direction, parallel to a direction of movement in operation, the water current turbines connected to the support being distributed in at least two groups, the water current turbines of a first group being positioned in a first transverse plane, perpendicular to the direction of movement, the water current turbines of a second group being positioned in a second transverse plane, perpendicular to the direction of movement, the second transverse plane being parallel to and at a distance from the first plane.

4. The device for producing energy as claimed in claim 1, wherein the water current turbines of one and the same support have axes of rotation positioned around the support.

5. The device for producing energy as claimed in claim 1, wherein the device for producing energy comprises at least one system for controlling at least one of a pitch of one of the at least one water current turbine or a pitch of at least one support connecting at least two of the water current turbines.

6. The device for producing energy as claimed in claim 1, further comprising at least one ballast, connected to at least one of the water current turbine or to a support connecting at least two water current turbines, allowing for a modification or a buoyancy of at least one of the water current turbine or the support.

7. The device for producing energy as claimed in claim 1, further comprising at least one autonomous movement system, connected to at least one of the at least one water current turbine or a support connecting at least two of the water current turbines, the autonomous movement system being configured to control movements of at least one of the water current turbine or the support.

8. The device for producing energy as claimed in claim 1, further comprising at least one winch configured to wind up or unwind the at the least one mechanical linking cable of at least one of the at least one water current turbine or at least one support connecting at least two of the water current turbines.

9. The device for producing energy as claimed in claim 1, further comprising at least two sets of blades, the blades of different sets having counter-rotating movements.

10. The device for producing energy as claimed in claim 1, further comprising a system for converting the electrical energy produced by each towed water current turbine into at least one of hydrogen, a synthetic fuel, or any other energy.

11. The device for producing energy as claimed in claim 1, further comprising at least one flexible wing, a control system configured to control the flexible wing, suspended under the flexible wing, and a wind turbine connected to the control system to supply the control system with electrical energy.

12. The device for producing energy as claimed in claim 1,
    wherein the vessel is configured to move from upstream to downstream, and
    wherein the device for producing energy comprises
        at least one wing positioned downstream of the vessel,
        a control system configured to modify at least one characteristic of the wing, and
        a determining system configured to determine at least one characteristic of wind upstream of the vessel,
            the control system being configured to modify at least one characteristic of the wing depending on the at least one characteristic of the wind determined by the determining system.

13. The device for producing energy as claimed in claim 1, further comprising a wing having at least one semi-rigid or rigid first part and at least one second part that is movable with respect to the first part between more or less overlapping positions, each second part being configured to take up at least:
    a retracted state, corresponding to a minimum size of the wing, configured to stow the wing on the vessel; and
    a deployed state, configured to use the wing in flight.

14. The device for producing energy as claimed in claim 1, further comprising a plurality of wings and at least one handling system configured to grasp a wing and raise it so that the wing can fly, the handling system comprising at least one gripper configured to cooperate with a gripping point of a semi-rigid or rigid part of the wing.

15. A method for producing energy, comprising the following steps:
    providing a device for producing energy as claimed in claim 1;

setting the air-towed vessel in motion on a body of water;
unwinding the at least one mechanical linking cable such that the vessel tows the at least one water current turbine at a distance from the vessel; and
collecting and storing on the vessel the energy originating from electricity produced by said at least one water current turbine.

16. The device for producing energy as claimed in claim 1, wherein the at least one mechanical linking cable and the at least one electric cable each have a length greater than ten meters.

17. The device for producing energy as claimed in claim 1, wherein the at least one water current turbine is not connected to the vessel the by a rigid mechanical link.

* * * * *